3,459,683
ADDITION COMPOUNDS OF CERTAIN SODIUM AND LITHIUM SALTS WITH 4,4'-METHYLENEDIANILINE
Frederic C. McCoy, Beacon, and Howard V. Hess, Glenham, N.Y., assignors to Texaco Inc., New York, N.Y., a corporation of Delaware
No Drawing. Filed June 28, 1967, Ser. No. 649,480
Int. Cl. C10m 7/02
U.S. Cl. 252—49.7     2 Claims

ABSTRACT OF THE DISCLOSURE

Addition compounds formed by interaction of the nitrites and halides, except the fluorides, of sodium and lithium with 4,4'-methylenedianiline useful in greases, herbicides, and soldering compositions.

CROSS-REFERENCE TO RELATED APPLICATIONS

In our copending patent application Ser. No. 649,553, filed concurrently herewith, there is disclosed a process for the removal of the nitrites and halides, except fluorides, of sodium and lithium from their dilute aqueous solutions with 4,4'-methylenedianiline in a solvent having a mutual solubility for both water and 4,4'-methylenedianiline. In a second copending application Ser. No. 649,535, also filed concurrently herewith, there is disclosed a process for the removal of the nitrites and halides, except fluorides, of sodium and lithium from their concentrated aqueous solutions with solid 4,4'-methylenedianiline.

BACKGROUND OF THE INVENTION

Field of the invention

This invention is concerned with novel and useful compositions of matter formed by the reaction of the nitrite and halides, except the fluorides, of sodium and lithium with 4,4'-methylenedianiline. The addition compounds, which may be decomposed into the original constituents, are crystalline materials with a low affinity for water thus making it possible to handle the compositions in highly humid atmospheres without their being affected by moisture. The addition compounds are also useful in the field of grease manufacture where not only is the incorporation of sodium nitrite greatly facilitated, but its effectiveness is enhanced due to its slow release as the grease is used. The sodium chloride compositions are particularly useful in herbicides in that the useful effect is substantially prolonged due to their slow rate of decomposition into their original constituents, and the lithium salt compositions are useful in soldering compositions for magnesium alloys.

Description of the prior art

N. P. Marullo and R. A. Lloyd have reported (Journal of the American Chemical Society, vol 88, pages 1076–1077) the reaction of simple sodium salts in aqueous solution with racemic p,p'-diamino-2,3-diphenylbutane. Sodium salts reported to react were the chloride, bromide, iodide, nitrate and azide. Certain halides of potassium, rubidium and cesium also were reported to react similarly. The authors reported no results with lithium salts other than to refer to previous knowledge that amminelithium compounds are decomposed upon addition of water.

SUMMARY OF THE INVENTION

This invention relates to novel compositions prepared by the interaction of the nitrites and the halides, except fluorides, of sodium and lithium with 4,4'-methylenedianiline. More specifically, it relates to compositions prepared by the interaction of one or more of these salts with 4,4'-methylenedianiline to produce compounds containing methylenedianiline and the salt in a mol ratio of three to one.

The specific compositions contemplated by the present invention include the reaction products of 4,4'-methylenedianiline with the following salts in the ratio of three mols of methylenedianiline to one mol of salt; sodium chloride, sodium bromide, sodium iodide, sodium nitrite, lithium chloride, lithium bromide, lithium iodide and lithium nitrite.

In preparing the compositions of this invention, an aqueous solution or brine containing a sodium or lithium salt selected from the class consisting of the chloride, bromide, iodide and nitrite is reacted with 4,4'-methylenedianiline (also referred to hereinafter as MDA), either in a solvent, e.g. a ketone or alcohol, having a degree of mutual solubility for both water and for the MDA, or with solid MDA in the substantial absence of a solvent. If the salt is present in relatively dilute concentration, for example between about 1% and about 12% by weight, a solvent for the MDA preferably is employed. If the salt is present in concentration above about 12 percent by weight, then no solvent need be employed, solid crystalline MDA being added directly to the salt solution.

A crystalline precipitate formed by interaction of the salt and the MDA is separated from the liquid phase, e.g., by filtration. The precipitate has a 3:1 mol ratio of MDA to salt and may be decomposed into its original constituents by adding a solvent such as acetone at an elevated temperature in the range of about 40° to 100° C., depending on the volatility of the solvent.

In the solvent method of preparing our compositions, a relatively dilute aqueous solution (1 to 12 percent by weight salt) of a sodium or lithium salt selected from the group comprising the chloride, bromide, iodide, and nitrite is mixed with a solution of 4,4'-methylenedianiline in a suitable solvent, e.g., acetone or methanol, at a temperature in the range from about 50° C. to 30° C. Under these conditions, the MDA reacts with the sodium or lithium salt to form a crystalline precipitate consisting of MDA and the salt in a 3:1 mol ratio. The crystalline precipitate is then separated from the mother liquid by filtration, decantation, centrifuging or other suitable operation.

In the method of preparation in which a more concentrated salt solution (more than about 12 percent by weight of salt) is employed, solid crystalline MDA is added to the salt solution with agitation at a somewhat higher temperature in the range of from about 50° C. to 90° C. in an amount slightly in excess of the stoichiometric quantity required to react with that amount of salt which is present in excess of about 12 percent by weight. Under these conditions three mols of MDA react with one mol of salt to form a crystalline precipitate which may be separated from the remaining solution by filtration, decantation, centrifuging or other suitable operation.

We have found that when starting with a concentrated salt solution and using solid MDA, there is a minimum residual salt concentration in the aqueous phase of about 12 percent by weight. Even when a large stochiometric excess of MDA is used, the salt content is not reduced below this minimum residual concentration. In order to react additional quantities of the salt and thus obtain a lower residual salt concentration, the solvent method as described hereinbefore may be employed.

EXAMPLES

As one example, a 25 cc. portion of an aqueous solution containing 2.96% by weight of sodium chloride was mixed at room temperature with 100 cc. of a saturated solution of 4,4'-methylenedianiline dissolved in Formula 30 denatured ethyl alcohol. A saturated solution of MDA in alcohol at room temperature contains approximately 18% by weight of MDA. Formula 30 alcohol consists of 10 parts by volume of 95% ethyl alcohol and 1 part of methyl alcohol. A crystalline precipitate was formed which was separated from the mixture by filtration. Analysis showed the precipitate to contain 9% by weight of sodium chloride. Since the remaining 81 weight percent of the precipitate is MDA, this is equivalent to a 3:1 mol ratio of methylenedianiline to sodium chloride. Table I shows some properties of the precipitate in comparison with corresponding properties of sodium chloride and of 4,4'-methylenedianiline. In other tests, acetone, methyl alcohol, isopropyl alcohol, methyl Cellosolve, propylamine and tetrahydrofuran were used as solvent for the MDA with equal effectiveness.

TABLE I

| | NaCl | MDA (Technical) | NaCl-MDA Precipitate |
|---|---|---|---|
| Appearance | White Crystals. | Brown Crystals. | Tan Crystals. |
| Melting Point, °C | 1,413 | 93 | 170. |
| Solubility: | | | |
| Water | V. sol | Sl. sol | Decomposes in hot water. |
| Acetone | V. sl. sol | V. sol | NaCl precipitates out. |
| Glacial Acetic Acid. | V. sl. sol | V. sol | V. sol. |
| Benzene: | | | |
| Cold | Insol | V. sol | V. sl. sol. |
| Hot | Insol | V. sol | Decomposes in boiling benzene. |

In other tests, aqueous solutions containing from 3% to 6% of sodium bromide, sodium iodide, sodium nitrite and lithium chloride, lithium bromide, and lithium iodide by weight all reacted in the same manner with solutions of MDA as did the sodium chloride described above. The results of these preparations are summarized in Table II.

ground to a particle size of below about 10 microns. Sodium nitrite is hygroscopic and considerable difficulty is often encountered in the grinding and handling operations. We have found that the reaction product of sodium nitrite with 4,4'-methylenedianiline prepared in accordance with the procedure set forth hereinbefore is particularly suited as a medium for incorporating sodium nitrite into a grease since it is non-hygroscopic and may be handled without any special precautions or special procedures, and the effectiveness of the sodium nitrite is improved in that it is released gradually by decomposition of the MDA reaction product as the grease is worked.

A sample of a product prepared by the reaction of sodium nitrite with methylenedianiline in accordance with procedure described above was ground to a very fine powder and 0.3 gram of the powdered material was incorporated into a 30 gram sample of a NLGI No. 2 grade sodium-calcium grease by thorough hand-mixing. The resulting grease which contained approximately 0.1% by weight of sodium nitrite was found to have excellent rust protective properties and passed the ASTM D1743 Bearing Rust Test. The grease containing the sodium nitrite-MDA product was equal in all respects to similar greases prepared in accordance with present procedures. The same grease without the sodium nitrite-MDA product failed the bearing rust test.

The sodium chloride-methylenedianiline composition advantageously may be used as a slow-release herbicide in agricultural formulations with the methylenedianiline additionally contributing insecticidal properties thereto.

Compositions formed by the reaction of lithium chloride and lithium bromide with methylenedianiline have utility as ingredients in soldering compositions for magnesium alloys.

In addition, the salt-methylenedianiline compositions also provide a practical means for storing methylenedianiline in solid form at temperatures in excess of the melting point of the methylenedianiline.

TABLE II

| Sample | A | B | C | D | E | F | G | H |
|---|---|---|---|---|---|---|---|---|
| Aqueous Salt Solution: | | | | | | | | |
| Type of Salt | Sodium Chloride. | Sodium Bromide. | Sodium Iodide. | Sodium Nitrite. | Lithium Chloride. | Lithium Bromide. | Lithium Iodide. | Lithium Nitrite. |
| Salt Content, Percent by wt | 7.4 | 3–5 | 3–5 | 3–5 | 6 | Approx. 70 | Approx. 60 | 7. |
| Volume used, cc | 500 | 5 | 5 | 5 | 5 | 5 | 10 | 5. |
| MDA Solution: | | | | | | | | |
| Solvent | F-30 [1] | F-30 [1] | F-30 [1] | F-30 [1] | Methylal | F-30 [1] | F-30 [1] | F-30.[1] |
| Percent MDA by wt | 10.5 | 18 [2] | 18 [2] | 18 [2] | 15 | 18 [2] | 18 [2] | 18.[2] |
| Volume used, cc | 2,000 | 25 | 25 | 25 | 30 | 25 | 50 | 25. |
| Reaction Temp., °C | 20–25 | 20–25 | 20–25 | 20–25 | 20–25 | 20–25 | 20–25 | 20–25. |
| Precipitate: | | | | | | | | |
| Melting Pt., °C.[3] | 185 | 185 | 180 | 150 | >220 | >300 | >300 | 185. |
| Analysis, Percent by wt | 3.3 Na, 5.4 Cl, 70.7% C, 6.4% H, 13.1% N. | 3.28 Na, 10.6 Br. | 3.10 Na, 16.2 I. | 3.57 Na, 14.4 N. | 7.1 Li Cl | 0.99 Li, 11.8 Br, 12.4 N. | 0.90 Li, 17.3 I. | 0.90 Li, 11.5 N. |
| Mol Ratio MDA/Salt [4] | 3.2 | 3.0 | 3.0 | 3.0 | 2.7 | 3.1 | 3.3 | 3.6. |

[1] Formula 30 denatured alcohol comprised of 10 volumes 95% ethyl alcohol and 1 volume methyl alcohol.
[2] Saturated solution.
[3] Approximate. Complexes do not melt sharply.
[4] Basis Metal Analysis.

The compositions of this invention also may be prepared by the addition of solid 4,4'-methylenedianiline to concentrated solutions in which the salt is present in an amount in excess of about 12 percent by weight in accordance with the procedure described in application Ser. No. 649,535, filed concurrently herewith. For example, a concentrated sodium chloride brine containing 20% by weight NaCl was mixed with 800 grams of solid methylenedianiline per liter of brine with agitation at a temperature of 70–75° C. The resulting precipitate, consists of methylenedianiline and salt in a mol ratio of 3:1. Corresponding compositions of the other sodium and lithium salts enumerated above may be prepared from concentrated solutions of the salt by similar procedures.

In the manufacture of certain greases, it is desirable to incorporate a small amount of sodium nitrite as an additive for imparting anti-rusting properties to the final product. For appearance purposes, the sodium nitrite is Whereas it is reported in the prior art that p,p'-diamino-2,3-diphenylbutane reacts with sodium nitrate to form a coordination compound, we have found that 4,4'-methylenedianiline does not react with sodium nitrate. It is also reported that certain halides of potassium form adducts with p,p'-diamino-2,3-diphenylbutane. We have found that 4,4'-methylenedianiline does not react with any potassium salts. It is also reported that only the racemic form of p,p'-diamino-2,3-diphenylbutane forms a complex with some of the simple sodium salts whereas the meso form is unable to coordinate. The 4,4'-methylenedianiline of the present invention has no racemic form. Rather it is equivalent to a meso form in that the molecule is optically inactive and cannot be separated into optically active isomers.

From the foregoing it is obvious that the ability of 4,4'-methylenedianiline to form a precipitate with sodium salts cannot be predicted from the prior art and the compositions of the present invention are novel and distinct from the compositions of the prior art.

Obviously, many modifications and variations of the invention, as hereinbefore set forth, may be made without departing from the spirit and scope thereof, and therefore only such limitations should be imposed as are indicated in the appended claims.

We claim:

1. Addition compounds formed by interaction of 4,4'-methylenedianiline and a salt selected from the group consisting of the nitrites, chlorides, bromides and iodides of sodium and lithium, in a mol ratio of three to one.

2. Grease compositions containing a minor anti-rust amount of an addition compound formed by interaction of 4,4'-methylenedianiline and sodium nitrite in a mol ratio of three to one.

References Cited
UNITED STATES PATENTS

| | | | |
|---|---|---|---|
| 3,306,712 | 2/1967 | Goodenough et al. | 23—89 |
| 3,320,166 | 5/1967 | McCoy et al. | 252—49.7 |

DANIEL E. WYMAN, Primary Examiner

I. VAUGHN, Assistant Examiner

U.S. Cl. X.R.

252—25, 389; 260—570